United States Patent
Ramstack (10) Patent No.: US 6,906,659 B1
(45) Date of Patent: Jun. 14, 2005

(54) SYSTEM FOR ADMINISTERING A RESTRICTED FLIGHT ZONE USING RADAR AND LASERS

(76) Inventor: Tom Ramstack, 816 Easley St #407, Silver Spring, MD (US) 20910

( * ) Notice: Subject to any disclaimer, the term of this patent is extended or adjusted under 35 U.S.C. 154(b) by 0 days.

(21) Appl. No.: 10/741,373

(22) Filed: Dec. 19, 2003

(51) Int. Cl.⁷ ............................. G01S 13/86; G01S 13/88
(52) U.S. Cl. ............................. 342/54; 342/27; 342/28; 342/52; 342/175; 342/195; 89/1.11; 356/4.01
(58) Field of Search ............................. 356/4.01–5.15; 342/27, 28, 52–59, 61–67, 82, 89–103, 118, 146, 147, 155, 156–158, 175, 195; 89/1.11

(56) References Cited

U.S. PATENT DOCUMENTS

| | | | |
|---|---|---|---|
| 3,019,711 A | * | 2/1962 | Bailey et al. ............. 342/67 |
| 3,135,053 A | * | 6/1964 | Newman et al. .......... 342/67 |
| 4,622,554 A | * | 11/1986 | Gellekink et al. ........ 342/67 |
| 4,667,203 A | | 5/1987 | Counselman, III |
| 4,686,128 A | | 8/1987 | Gentilman |
| 4,870,422 A | | 9/1989 | Counselman, III |
| 5,036,748 A | * | 8/1991 | Pendry ..................... 342/67 |
| 5,170,168 A | | 12/1992 | Roth |
| 5,191,339 A | | 3/1993 | Riza |
| 5,194,871 A | | 3/1993 | Counselman, III |
| 5,198,607 A | | 3/1993 | Livingston et al. |
| 5,340,056 A | | 8/1994 | Guelman et al. |
| 5,384,574 A | | 1/1995 | Counselman, III |
| 5,467,682 A | * | 11/1995 | Brooks ..................... 342/67 |
| 5,619,212 A | | 4/1997 | Counselman, III |
| 5,646,625 A | | 7/1997 | Burrier |
| 5,788,110 A | | 8/1998 | Alhamad |
| 5,796,474 A | | 8/1998 | Squire et al. |
| 5,963,574 A | | 10/1999 | Gregor et al. |
| 5,992,288 A | | 11/1999 | Barnes |
| 6,396,577 B1 | | 5/2002 | Ramstack |
| 6,717,543 B2 | * | 4/2004 | Pappert et al. ........... 342/67 |

* cited by examiner

Primary Examiner—Bernarr E. Gregory (57) ABSTRACT

A system is disclosed for administering a restricted flight zone using radar and lasers for detecting, tracking, warning and destroying airborne craft that enter restricted flight zones without authorization or that approach dangerously close to protected areas on the ground. The system comprises a support for positioning adjacent the surface of the Earth at a bottom of the zone, detecting and defending apparatus mounted on the support for detecting airborne objects in the zone and defending against the airborne objects in the zone, and controlling apparatus for controlling the detecting and defending means.

19 Claims, 7 Drawing Sheets

SYSTEM FOR ADMINISTERING A RESTRICTED FLIGHT ZONE USING RADAR AND LASERS

BACKGROUND OF THE INVENTION

1. Field of the Invention

The present invention relates to air defense systems, and more particularly pertains to a single unified system that may detect, warn and even destroy airborne objects that enter restricted flight zones before the airborne objects can strike buildings, facilities or persons on the ground.

2. Description of the Prior Art

Restricted flight zones, including the so-called "no fly" zones, are often defined in terms of a geographical zone on the Earth's surface. The administration of the air space in the restricted flight zones typically requires monitoring the identity, movement, and activity of various airborne objects in the air space of the zone.

Radar systems using radio frequency waves are well known for detecting and tracking objects in the atmosphere of the Earth for the purpose of air defense. Such systems use transmitters to transmit radio waves into a selected area of the atmosphere and receivers to detect any radio waves that bounce back from a detected object within the area of transmission. Radar is used for guiding manned aircraft and unmanned weapons systems to their targets for interception, and, if necessary, for destruction. Thus, the conventional air defense systems have typically employed one system for detecting and tracking objects in the atmosphere, and a relatively separate system for destroying, or otherwise rendering ineffective, objects representing a threat to the protected ground area below the area of the atmosphere being patrolled.

Phased array radar, in which the frequency and amplitude are in phase, is a system that uses a stationary radar antenna that can transmit in one direction. The same antenna both transmits and receives radar wave signals. The degree of angle for coverage of the phased array radar can be set by the control subsystem of the radar. One precision approach radar, for example, covers 30 degrees of the horizon. Each system can be set to transmit and receive radar signals on a different frequency. Such systems are currently used by the U.S. Navy for precision approach radar on aircraft carriers, at airports, and to track missiles.

Lasers (which is an acronym for Light Amplification by the Stimulated Emission of Radiation) have been developed that employ relatively higher frequency, shorter wavelength electromagnetic radiation waves in the ultraviolet, visible and infrared region of the electromagnetic spectrum. A laser is an electro-optical device for producing a high power, monochromatic, low divergence, and coherent light source.

Different types of lasers can be employed for a transmitter, depending upon the power and wavelength of the electromagnetic wave employed in the laser system. The portion of the laser generating device where the excitation of the atoms actually occurs may be in a medium that comprises a solid, liquid, or gaseous material.

Solid state laser emissions are produced, for example, when high-voltage electricity causes a quartz flash tube to emit an intense burst of light, exciting some of the atoms in a ruby crystal to higher energy levels. At a specific energy level, some atoms emit particles of light called photons. At first, the photons are emitted in all directions. Photons from one atom stimulate emission of photons from other atoms and the light intensity is rapidly amplified. Mirrors at each end reflect the photons back and forth in the medium, continuing this process of stimulated emission and amplification. The photons leave through the partially silvered mirror at one end, and these exiting photons form the laser light emission or beam. By varying the intensity of the light source, the intensity of the laser output also can be varied.

Some of the military applications of lasers involve shooting down missiles. An example of this application occurred during a Jun. 7, 2000 test at White Sands Missile Range, N.M., in which the U.S. Army used its Tactical High Energy Laser/Advanced Concept Technology Demonstrator (THEL/ACTD) to shoot down a rocket carrying a live warhead. The test demonstrated the first high-energy laser weapon system designed for operational use. After the rocket was launched, a fire control radar detected the rocket, tracked it with its high precision pointer tracker system, and then engaged the rocket with its high-energy chemical laser. After several seconds of having the laser beam directed on the warhead, the rocket exploded in mid-air.

The U.S. Army and Air Force also have been testing a similar airborne system using solid state lasers. The lasers may be carried by airplanes that may direct the beams at incoming missiles to destroy them, similar to the Jun. 7, 2000 test at White Sands Missile Range.

One system developed by the Raytheon Co. includes a portable tactical high energy solid state laser that may be deployed on top of Humvee personnel transport vehicles or tanks and that may generate 100 kilowatts of energy to be aimed at a specific target. Intended targets include aircraft, such as helicopters and airplanes. Further developments will attempt to increase the intensity of solid state lasers, possibly to shoot down missiles at greater distances.

The present invention substantially departs from the conventional concepts and designs of the prior art, and in so doing provides an apparatus primarily developed for the purpose of providing a single unified system that may detect, track, warn and even destroy airborne objects that enter restricted flight zones without authorization, or even approach so closely to protected areas on the ground that the protected areas are in danger of damage or destruction by collision from the airborne craft.

SUMMARY OF THE INVENTION

In view of the foregoing limited uses of lasers and radar present in the known prior art, the present invention provides a new apparatus and method for detecting, tracking, warning and destroying airborne craft that enter restricted flight zones without authorization or that approach dangerously close to protected areas on the ground.

The general purpose of the present invention, which will be described subsequently in greater detail, is to diminish the risk of military, terrorist, or even accidental attacks that could be accomplished through aircraft or other airborne objects striking an object, area or persons on the ground.

To attain this, the present invention generally comprises a support for positioning adjacent the surface of the Earth at a bottom of the zone, detecting and defending means mounted on the support for detecting airborne objects in the zone and defending against the airborne objects in the zone, and controlling means for controlling the detecting and defending means.

In one preferred embodiment of the invention, the detecting and defending means comprises a plurality of radar/laser clusters mounted on the support, and each of the radar/laser clusters transmit along an axis defining a detection vector.

The axis of the detection vector of each radar/laser cluster radiates outwardly from the support and extending into and through the zone.

In one preferred embodiment of the invention, each of the radar/laser clusters comprises at least one radar assembly for detecting airborne objects in the zone, and at least one laser assembly for defending against airborne objects in the zone. The laser assembly generates a laser beam extending along an axis of a defending vector.

The system may be programmed to detect airborne objects via the radar assemblies of one or more clusters, and illuminate the laser assemblies of those clusters upon the detection of an airborne object within the restricted flight zone. As airborne objects enter a restricted flight zone, the system may illuminate the laser assemblies of the clusters whose radar assemblies have detected reflected radio waves indicating the presence of the airborne object. The laser assemblies may have a variable intensity, and as the airborne object approaches closer to the support in the protected zone, the intensity of the laser beams from the laser assemblies may be increased. Initially, as the airborne objects enter the restricted flight zone, the laser beams may be of a relatively low intensity so as to serve merely to warn the airborne object or objects (and their pilots) of their trespass into the restricted flight zone. As the airborne object continues moving further into the restricted flight zone, the system may increase the power to the laser assemblies to thereby gradually increase the intensity of their laser beams. Before the airborne objects could strike the system, or objects, persons or facilities on the ground, the intensity of the lasers would increase to a relatively high intensity, thereby most likely destroying the airborne object in mid-air by burning through its operational flying components, its fuel tank, or its fuselage.

Airborne objects moving beyond the defending vector of one radar/laser cluster and into the defending vector a second cluster may be tracked by the second cluster which would continue the defensive laser illumination at the same intensity as the first cluster. The intensity may be determined by proximity to the support or protected objects, azimuth, and speed of the airborne object, rather than, for example, length of time within the restricted flight zone.

For airborne objects approaching at relatively faster speeds, the intensity of the lasers may increase to relatively higher levels at a greater distance from the system than those airborne objects moving at slower speeds, and thus the slower airborne objects may be hit by the higher intensity laser beams only when they have moved closer to the system of the restricted flight zone. Because the fastest airborne objects represent the greatest threat of striking the protected area, the purpose of varying the intensity of the laser beams would be to deflect or destroy approaching airborne objects based on the immediacy of the threat created by their speed and angle of approach.

Optionally, airborne objects authorized to enter the restricted flight zone may be equipped to send a coded radio signal to a receiver of the system to deactivate the defensive mechanism of the system with respect to that airborne object.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

With reference now to the drawings, and in particular to FIGS. 1 through 7 thereof, a new system for administering a restricted flight zone using radar and lasers embodying the principles and concepts of the present invention and generally designated by the reference numeral 10 will be described.

Figure 1:
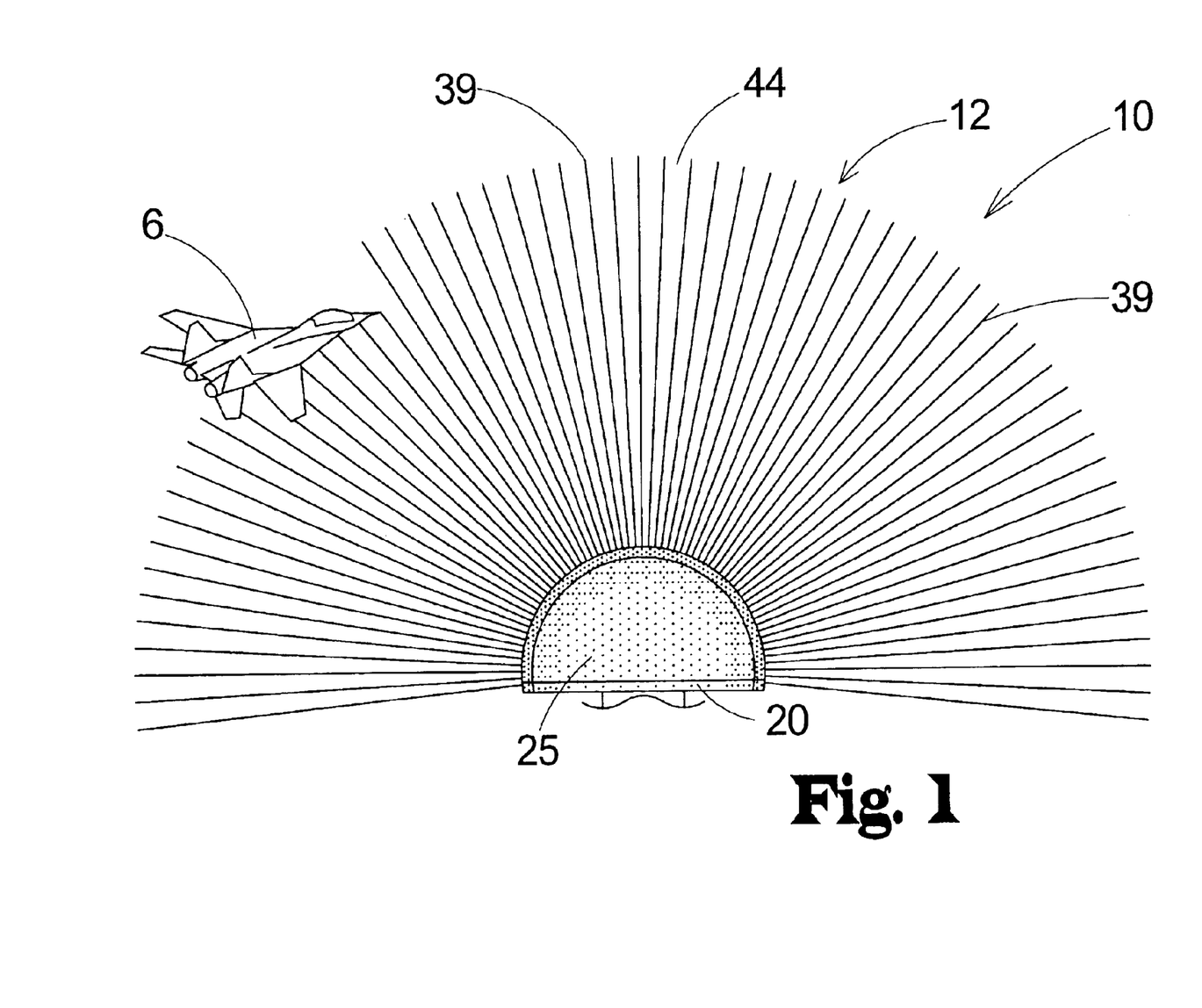
FIG. 1 is a schematic side view of a new system according to the present invention with the laser emissions being represented by lines radiating outwardly from a support of the system.

The invention contemplates a system 10 that creates a hemispherical zone 12 about a location on, or slightly above, the surface 2 of the Earth, whether comprising land 3 or a body 4 of water or a combination of both (see FIG. 1). In this zone 12 created by the system of the invention, objects such as, and most importantly, aircraft 5 and missiles 6 may be detected, tracked and optionally destroyed by the system for protecting the area 14 about the location of the system 10 in the zone 12. For the purposes of the following description, the protected zone 12 refers to the generally hemispherical space extending above the surface of the Earth and generally centered on the location at which the system is operating. The protected area 14 referred to describes the generally circular part of the surface of the Earth that lies below the protected zone and is generally centered on the location of the system.

The system 10 includes a support 20 that is preferably positioned at a location substantially central to the area 14 to be protected (see FIG. 1), and may be located at the horizontal center of the zone 12. In one embodiment of the invention, the support 20 has a convex outer extent 22 (see FIGS. 1 and 2). The convex outer extent 22 is most preferably hemispherical in shape, although relatively flatter or less curved convex outer extent shapes may be used. In a preferred embodiment of the invention, the outer extent of the support comprises a generally continuous outer surface 24, and may thus comprise a hemispherical dome structure. Optionally, the support may be fixed in position, or could be made relatively mobile for moving between locations. Ideally, the structure of the support is formed from a relatively strong, heat-resistant material, such as a carbon composite material or a durable ceramic material. As a further option, substantially the entire structure (including the laser and radar transmitters described below) could be enveloped in a rugged armoring material to protect the system from damage, and the armoring material may form the outer extent of the support. Portals may be formed in the protecting material to allow free passage of laser beams and radar waves outwardly from the support, but the portals should not be so small that the outer extent impedes reception of radar waves returning to the radar antenna after bouncing off of aircraft or other airborne objects moving through the restricted flight zone.

Figure 2:
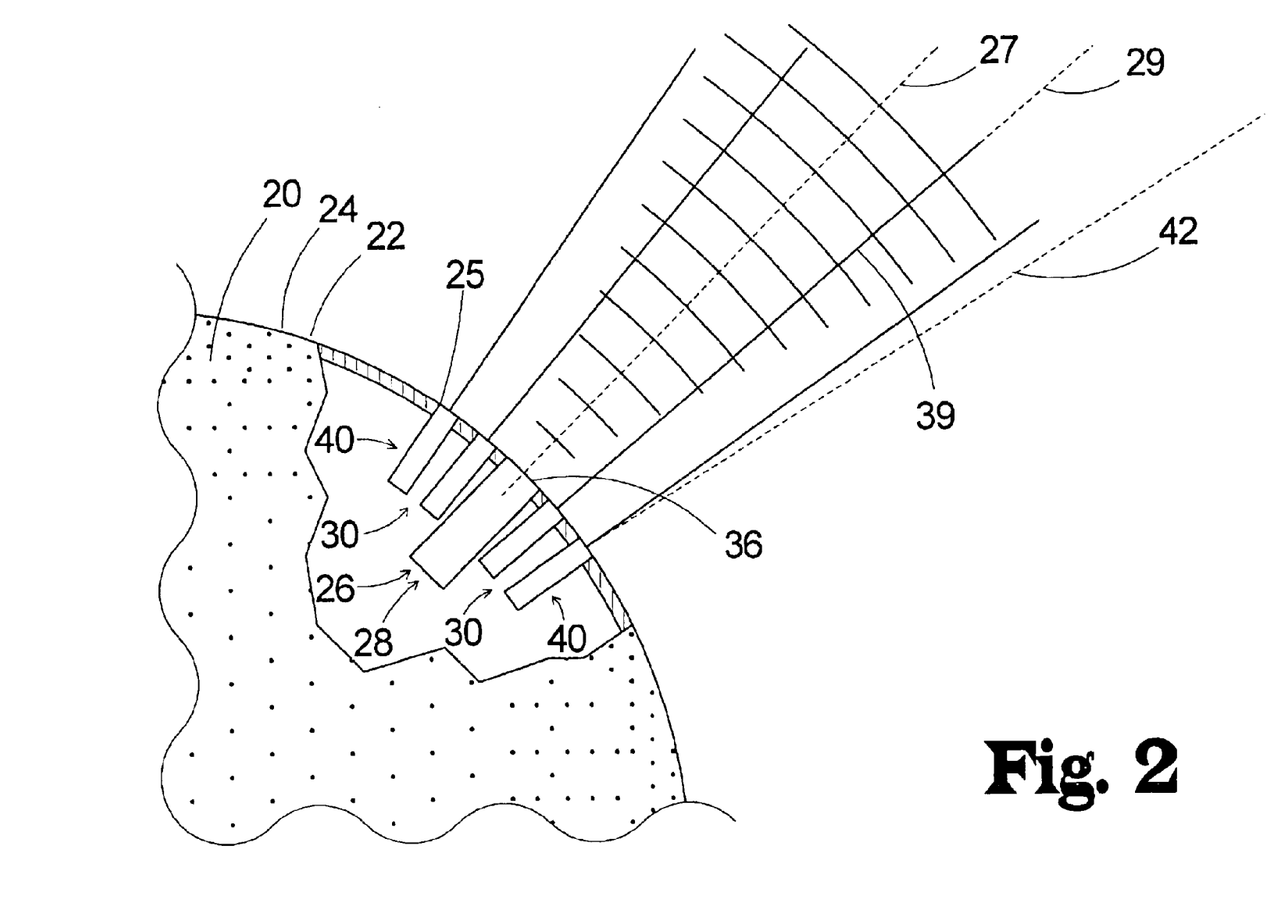
FIG. 2 is a schematic side view of the support of the present invention with a portion of the outer extent of the support broken away at one of the ports in the support to show a radar/laser cluster comprising a radar assembly antenna and a set of laser assemblies.

The interior of the structure of the support 20 may be substantially open or hollow to accommodate the laser transmitters and phased array radar antennae (see FIG. 2). Other components of the laser and radar system of the invention optionally may be located outside of the structure of the support to protect the components from heat and radiation generated by the laser transmitters, as well as permitting easier maintenance and replacement of the components.

The system 10 includes detecting and defending means mounted on the support 12 for detecting airborne objects in the zone and defending against the airborne objects in the zone. In one embodiment of the invention, the detecting and defending means comprises a plurality of radar/laser clusters 26 for detecting and monitoring airborne objects in the zone 12 (see FIGS. 2 and 6). The plurality of radar/laser clusters 26 may be mounted on the support 20. Each of the radar/laser clusters 26 may transmit along an axis 27 that defines a detection vector extending from the radar/laser cluster into and through the zone 12. The axis 27 of the detection vectors of the plurality of the radar/laser clusters 26 may radiate outwardly from the support with substantially uniform angles between the axes of the adjacent radar/laser clusters.

Each of the radar/laser clusters 26 includes at least one radar assembly 28 and at least one laser assembly 30. Each of the radar assemblies 28 may comprise a radar transmitter 32, a radar receiver 34, and an antenna 36. The antenna 36 is in communication with the radar transmitter 32 and radar receiver 34 (see FIG. 4). The antenna 36 of the radar transmitter 32 transmits along the axis 27 of the detection vector, and the antenna is also adapted to receive return waves reflected from an airborne object along the axis of detection vector (see FIG. 2). The laser assembly 30 may comprise a laser transmitter 38 that generates a laser beam 39 which may be oriented along an axis 29 of a defending vector. Preferably, the axis 29 of the detection vector is oriented substantially parallel to the axis 27 of the defending vector of the radar/laser cluster.

The radar/laser clusters 26 may each have an outer limit of effective range that defines an outer periphery of the zone or the furthest extent of the zone, with the radial reach of the plurality of radar/laser clusters defining an outer periphery of the substantially hemispherical zone.

Figure 6:
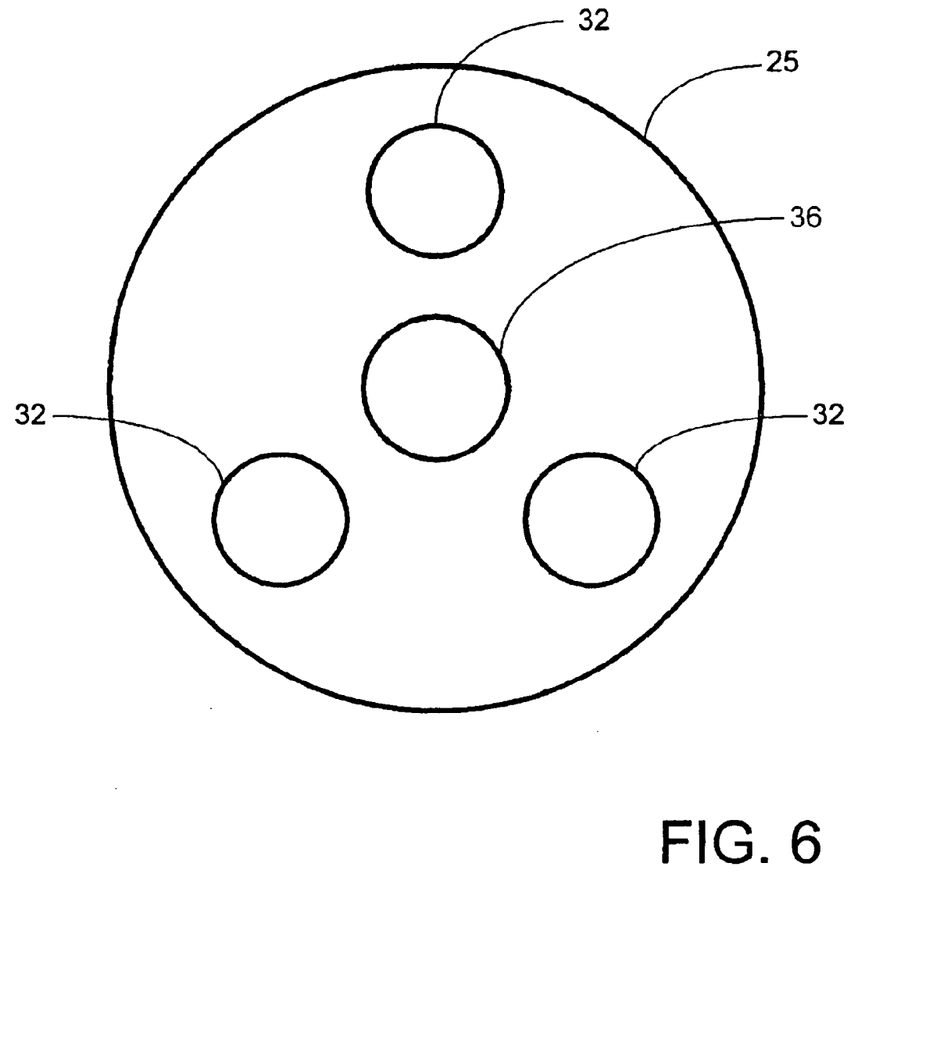
FIG. 6 is a schematic diagrammatic representation of one configuration of a radar/laser cluster of the system of the invention.
Figure 7:
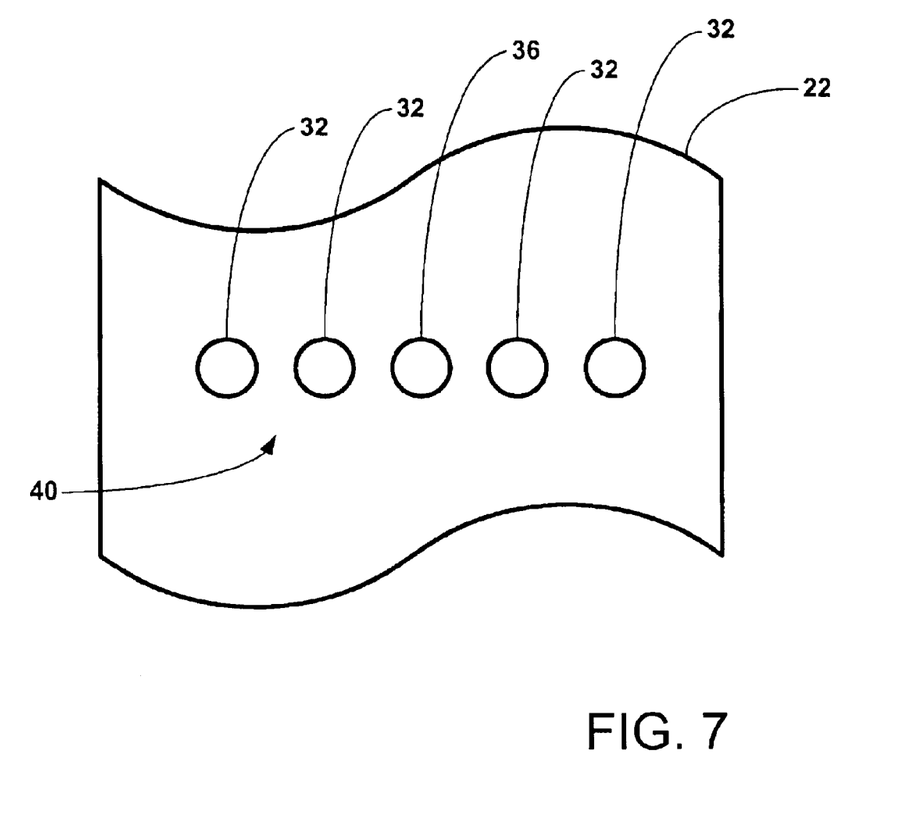
FIG. 7 is a schematic diagrammatic representation of another configuration of a radar/laser cluster of the system of the invention.

Each of the plurality of radar/laser clusters 26 may include a set 40 of more than one laser assembly 30 (see FIG. 6), and the set of laser transmitters 38 of the more than one laser assemblies of each radar/laser cluster may be oriented such that the axis 29 of the defending vector of each laser transmitter 38 of the set 40 is substantially parallel to the axis of the defending vector of other laser transmitters 38 of the set. The laser transmitters 38 of the laser assembly 30 of each radar/laser cluster may be positioned around the antenna 36 of the radar assembly 28 of the radar/laser cluster. Illustratively, as shown in FIG. 6, the radar/laser cluster 26 may have the laser transmitters 38 of the set oriented about the radar antenna 36. Preferably, all of the laser transmitters 38 in each set 40 of laser assemblies transmit the laser beams simultaneously, or substantially simultaneously, into the zone. Optionally, as shown in FIG. 7, the laser transmitters 38 may be positioned in a line about the radar antenna 36.

The plurality of radar/laser clusters 26 may be positioned in an array that substantially covers the outer extent 22 of the support 20 (see FIGS. 1 and 2). Preferably, the radar/laser clusters are arrayed closely enough together along the outer extent of the support that no significant gaps exist in the laser beams radiating outwardly from the support that might allow an unauthorized airborne object to move through the protected zone 12 while avoiding being hit by one or more laser beams. The actual number of radar/laser clusters mounted on the support may vary. It is believed that using less than approximately 100 laser transmitters would in many cases provide inadequate protection for a substantially hemispherically-shaped halo 44. The greater the number of laser transmitters that can be arrayed on the dome, and the more tightly the laser beams are grouped and the closer the laser beams of adjacent radar/laser clusters may be positioned, the relatively better the protection that may be provided by the radar/laser clusters against airborne objects moving into the protected zone 12.

The outer extent 22 of the support 20 may comprise a substantially continuous surface, and a plurality of ports 25 may be formed in the surface for permitting the laser beam 39 from the laser assembly 30 and the radar signals of the radar assembly 28 of the same radar/laser cluster 26 to pass through the same port 25 such that radar signals may both be transmitted and received by the antenna of the radar assembly through the same port 25 which the laser beam passes through. Preferably, the array of radar/laser clusters 26 is substantially coextensive with the outer extent 22 of the support 20 and are arranged in a substantially uniform density covering the outer extent for creating a halo 44 of radar waves and laser beams about the support 20 and in the zone 12 (see FIG. 1). In one embodiment of the invention, the plurality of radar/laser clusters are positioned in a plurality of rows that extend from a top center of the outer extent 22 of the support 20 downwardly toward the periphery of the support, although more randomly positioned configurations of the radar/laser clusters may be employed.

The axis 29 of the defending vector of each of the radar/laser clusters 26 may be oriented at an angle with respect to a normal axis that is oriented substantially perpendicular to a plane oriented tangent to the outer surface 24 of the outer extent of the support 20 (see FIG. 2). The axis 29 of the defending vector of each of the laser transmitters 38 of the set 40 for a radar/laser cluster may be oriented at substantially the same angle with respect to the normal axis, and preferably the angles formed by the axis of the defending vector and the normal axis have a non-zero measurement. However, the laser beam 39 of each laser transmitter 38 preferably does not cross the axes of other laser beams of other laser transmitters of other radar/laser clusters. In one illustrative embodiment, the path of the seams of a set 40 of laser transmitters 38 are oriented parallel to the normal axis of the hemispherical outer surface while the phased array radar of the same set 40 is also oriented parallel to the normal axis of the outer surface (see FIG. 2).

The radar assembly 28 of each radar/laser cluster 26 may transmit and receive radar signals at a frequency that is different from the frequencies at which the radar assemblies of the other radar/laser clusters transmit and receive for facilitating the determination of the position of an airborne object in the zone.

The laser transmitters 38 may be capable of generating laser beams of variable intensity, and a range of the intensities of the laser beams of the laser transmitters may extend from a relatively low intensity to a relatively high intensity. The relatively low intensity may be substantially harmless to airborne objects (such as a beam that merely illuminates the objects that the laser beam strikes) and the relatively high intensity may be capable of generating heat in an airborne object, and may raise the temperature of portions of the airborne object to such an extent that any explosive material contained in the airborne object is ignited by the heat. Thus, the intensity of the laser beams generated by the laser transmitters may have sufficient energy to destroy objects struck by the laser beam within a predetermined distance from the laser transmitter in the zone. Illustratively, the laser transmitters may generate laser beams having intensities greater than approximately 100 kilowatts.

The invention may also include controlling means for controlling the radar assemblies 28 and the laser assemblies 30 of each of the radar/laser clusters 26, and for controlling and coordinating the radars and lasers, and may comprise a programmable computer. The programmable computer of the system of the invention would provide information such as the distance to the targeted object, the speed of the targeted object, the azimuth, or angle of trajectory, of the targeted objects and, optionally, the size and shape of the targeted objects, depending on the sensitivity of the radar system selected.

Figure 5:
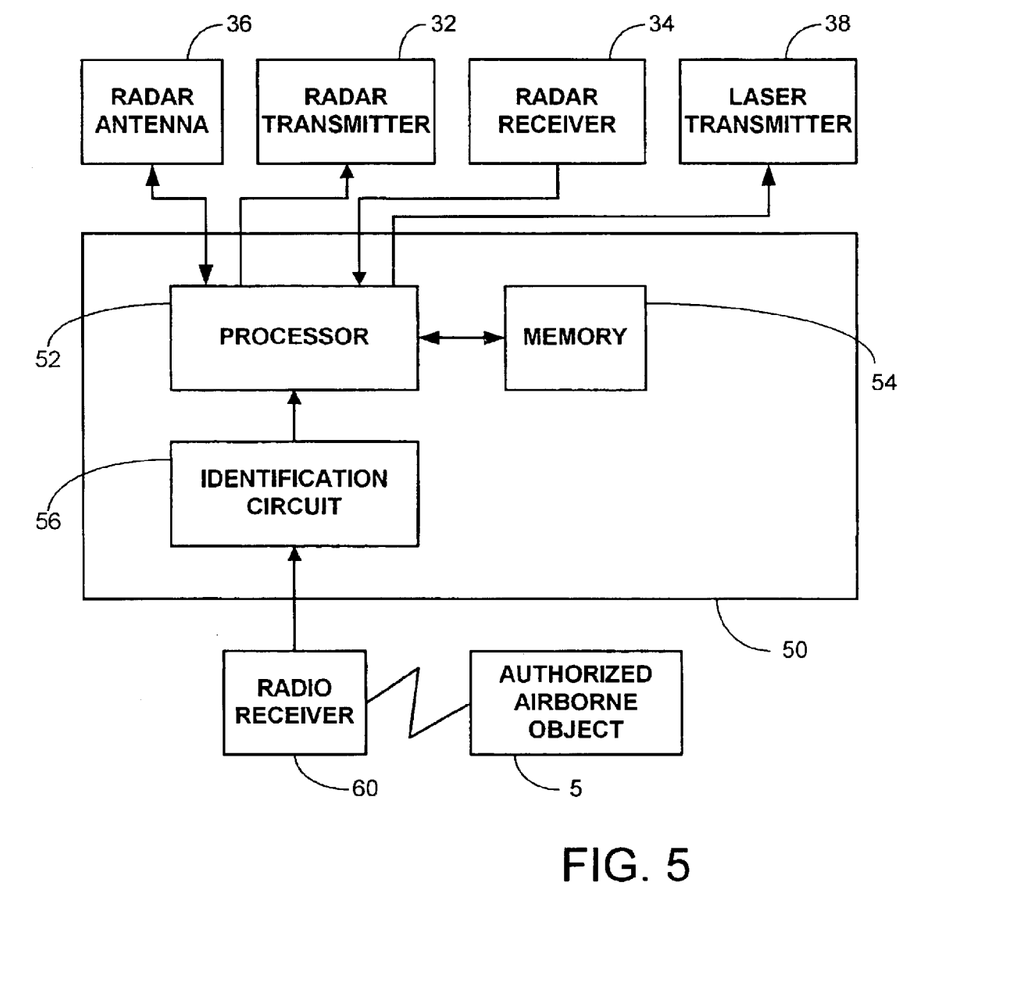
FIG. 5 is a schematic diagram of the relationship between one radar/laser cluster and the controlling means, and the relationship of the identification means to the components of the controlling means.

The controlling means 50 may comprise processing means, such as a processor 52 of the programmable computer, for processing information received from the antennas 36 of the radar assemblies 28 and the laser transmitters, and may also comprise storage means, such as memory 54, for storing information gathered by the processor (see FIG. 5). The processing means may process information from the radar assemblies of the clusters signals for comparing the information from the different radars such that airborne objects may be detected and tracked as the objects reflect radar waves back toward the radar antennae. The controlling means of the system may also include a signal processor, a combiner to interface with and combine radar information from radar assemblies of co-located radar/laser clusters, a multiplexer, ground networking, real-time monitoring and assessment capabilities, definable alarm limits to determine the degree to which the intensity of the lasers should increase as unauthorized airborne objects encroach, system support pedestals, a power supply, a computer local area network, data processors, an executive monitor, recorders, data acquisition and system control circuitry. Programming similar to that developed for phased array radar air traffic control systems could be used, but the system would need to be adapted to coordinate inputs from multiple radars and lasers emitting in sequence.

The controlling means may also comprise identification means, such as an identification circuit 56, for identifying authorized airborne objects in the zone 12. The identification circuit may comprise a radio receiver 60 for receiving radio signals from an authorized airborne object, and the controlling means (such as the processor 52) may be adapted to modify operation of the radar/laser clusters 26 with respect to the authorized airborne object when the radio signals are received from the authorized airborne object in the zone 12 until the authorized airborne object leaves the zone. For example, the processor 52 may suppress the transmission of laser beams 39 into the zone 12 while the authorized airborne object is present, or may at least suppress laser beam transmission in the direction of the authorized airborne object until it moves out of the zone. Conversely, the intensity of the laser beams 39 generated by the laser transmitters 38 may be controlled by the controlling means in such a manner so that the intensity of the laser beams of the laser transmitters are increased as an unauthorized airborne object moves closer to the support 20.

In greater detail, two kinds of lasers may be used within the same system. Solid state lasers, because of their size and relative ease of use, would be the preferred system with the status of current technologies. Solid state lasers may use ruby crystals to condense and direct light into beams. Chemical lasers, which can be the highest intensity and cause the greatest damage to objects struck by its beam, may also be used in the invention, especially if technologies improve to make them smaller and more practical. Chemical-based lasers typically employ a gaseous material, such as carbon dioxide ($CO_2$), to create the laser beam. In either case, the lasers should comprise laser beams that are continuously projected, rather than being intermittently pulsed beams.

In operation, each set of the laser transmitters 38 may preferably be directed by the controlling means to fire in sequence with the coextensive field of radar waves created by each phased array radar transmitter 32 as an unauthorized airborne object enters the zone and the field of radar waves. With the aid of the radar assembly for each set of lasers assemblies of a cluster 26, high-energy lasers can deposit intense amounts of infrared energy on targets at distances of tens of miles, or more. The intense energy and the speed of light characteristics make lasers attractive for defending against aircraft, missiles and short-range rockets among other threatening airborne objects.

When the radar assembly of one or more of the radar/laser clusters first detects an airborne object within or approaching too close to a restricted flight zone, information from the radar receiver 34 of the radar/laser clusters may be transmitted to processor 52 of the controlling means. The software of the processor may then turn on the laser transmitters 38 of the set 40 corresponding to the radar assembly of the detecting radar/laser cluster. Initially, at the farthest perimeter of the zone, the laser transmitters may be at their lowest power setting of intensity, which could be as low as approximately 5 watts. As the airborne object moves further into or across the zone, the processor may signal the laser transmitters to increase the power setting of intensity proportionate to the proximity to the support, or the perceived danger presented by the airborne object to protected areas, objects, persons, or facilities.

The danger presented by the airborne object may quantified, and thus measured, by the processor 52 as a combination of the speed of the airborne object, the angle of approach of the airborne object with respect to the support or the protected objects, persons, or facilities, and the proximity of the airborne object to the protected objects, persons or facilities. A highest intensity of the laser transmitters could range up to 100 kilowatts or more, depending on the limits of the laser assemblies. A system administrator may decide the rate at which the intensity of the laser beams should increase and set the transmitters accordingly.

Illustratively, an airplane approaching on a direct collision course with a protected object, person or facility at a speed of approximately 500 miles per hour may be hit by the highest intensity of laser beam at a distance of approximately five miles from the projected point of collision. In another illustration, an airplane crossing into the no-fly zone at approximately 150 miles per hour on a course that leads away from the zone may be hit with a relatively low intensity laser beam as close as approximately two miles from the protected objects, persons or facilities, so that little or no damage is caused to the aircraft. Instead, the lower intensity laser beams would serve to warn the pilot of the aircraft of the encroachment.

The system may intensify the laser beam or beams to a potentially destructive and deadly intensity level only at the point that an encroaching airborne object represents a significant threat of death or destruction to protected objects, persons or facilities on the ground. The purpose of increasing the intensity of the laser beams to high-intensity levels would be to destroy the encroaching airborne object in mid-air, before it has an opportunity to hit objects, persons or facilities on the ground.

High-intensity, or high-energy, is a relative term, and depends upon the amount of energy used for comparable systems. Moreover, improvements in technology often increase the intensity available from different kinds of lasers, thereby making some lasers relatively high intensity when previously they were considered relatively lower intensity.

The high-intensity, or high-energy, lasers should be used in the laser transmitters of the invention only to the extent they can be operated without damaging other systems of the invention, such as, for example, burning out electrical wiring. Also, the high-energy lasers may be employed as long as undue risks to safety, health or the environment of the protected area are not created. The intensity of the lasers should be set to adequately protect the restricted flight zone without causing undue dangers to persons or facilities on the ground or the system itself. When the system is deployed, it is contemplated that the power of the laser transmitters may be adjusted to levels where the undesirable effects are minimized to a tolerable level. Optionally, the power level of the laser transmitters may be adjusted or varied during operation of the system based on environmental factors.

In greater detail, the antennas of the radar assemblies may comprise monostatic antennae that function both to transmit the radar waves at a certain frequency and to receive the rebounding or reflected radar waves of the same frequency. Each of the radar receivers may be set to receive radar signals at a specific frequency unique to that specific radar transmitter/receiver antenna, thereby ensuring the laser assembly or assemblies of the radar/laser cluster would transmit outwardly only when an intruding aircraft has entered the portion of the zone 12 monitored by the corresponding radar assembly of the cluster.

To minimize signal noise from other radar or radio sources that could cause a mistaken firing of lasers of any of the surrounding sets, each radar assembly may be programmed to detect only radar waves at a specific frequency, which should be the same frequency at which the same radar assembly transmitted its signal. Each radar assembly on the support may operate at different frequencies to help ensure that each radar assembly detects only the radar waves emitted by that radar assembly.

The fields of outwardly-directed laser beams created by each laser assembly may be separated in orientation so that they no more than minimally overlap with the fields created by all surrounding laser assemblies of adjacent radar/laser clusters. As trespassing, or encroaching, airborne objects fly into the field of each radar/laser cluster, the laser transmitter or transmitters of a particular set would fire. As the aircraft passed beyond the field of one radar/laser cluster and into the field of another radar/laser cluster, the set of laser transmitters for the first radar/laser cluster would cease firing. However, the set of laser transmitters of the second radar/laser cluster may begin firing, with an intensity determined by the danger presented by the airborne object, based on its proximity, speed and azimuth, or trajectory, characteristics.

In one embodiment of the invention, the support of the system may be placed on a raised platform, or tower, located in the midst of a site where protection is desired, such as on a government building, a nuclear power plant, a chemical plant, a hydroelectric dam, a bridge, a skyscraper or a military installation, to create a canopy over the area.

Optionally, in another embodiment of the invention, the system, or a plurality of the systems, could be located on relatively higher terrain features, such as hillsides or mountaintops, that are located near cities, military bases or other sites to be protected. Because the periphery of the system may extend tens of miles or more, depending on the power of the radar and laser transmitters, relatively expansive areas such as large cities or other sites may be protected.

Figure 3:
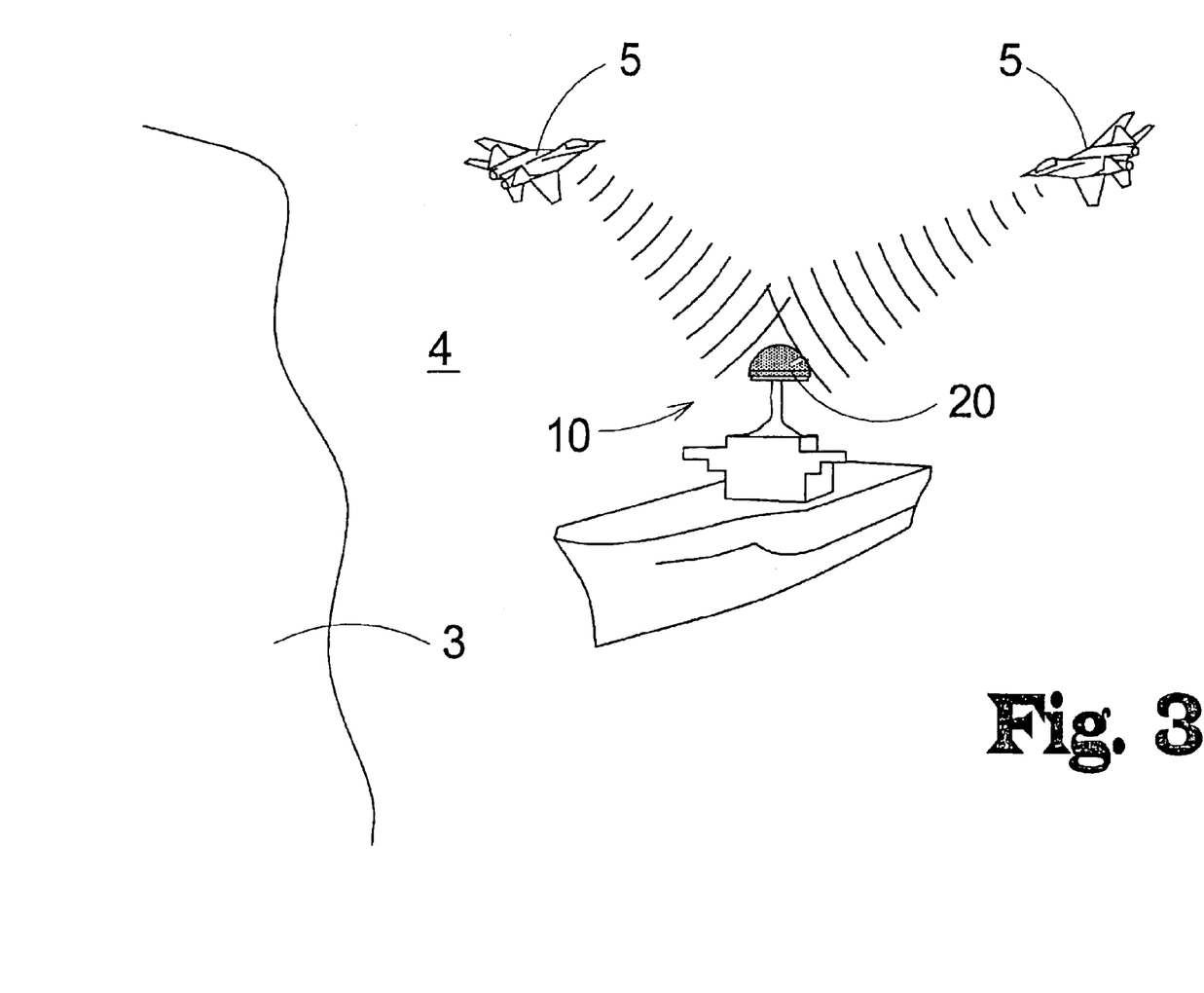
FIG. 3 is a schematic depiction of an airborne object moving into the zone protected by the system employed on a ship, and radio transmissions by the authorized airborne objects to the system to alter operation of the system with respect to those authorized airborne objects.
Figure 4:
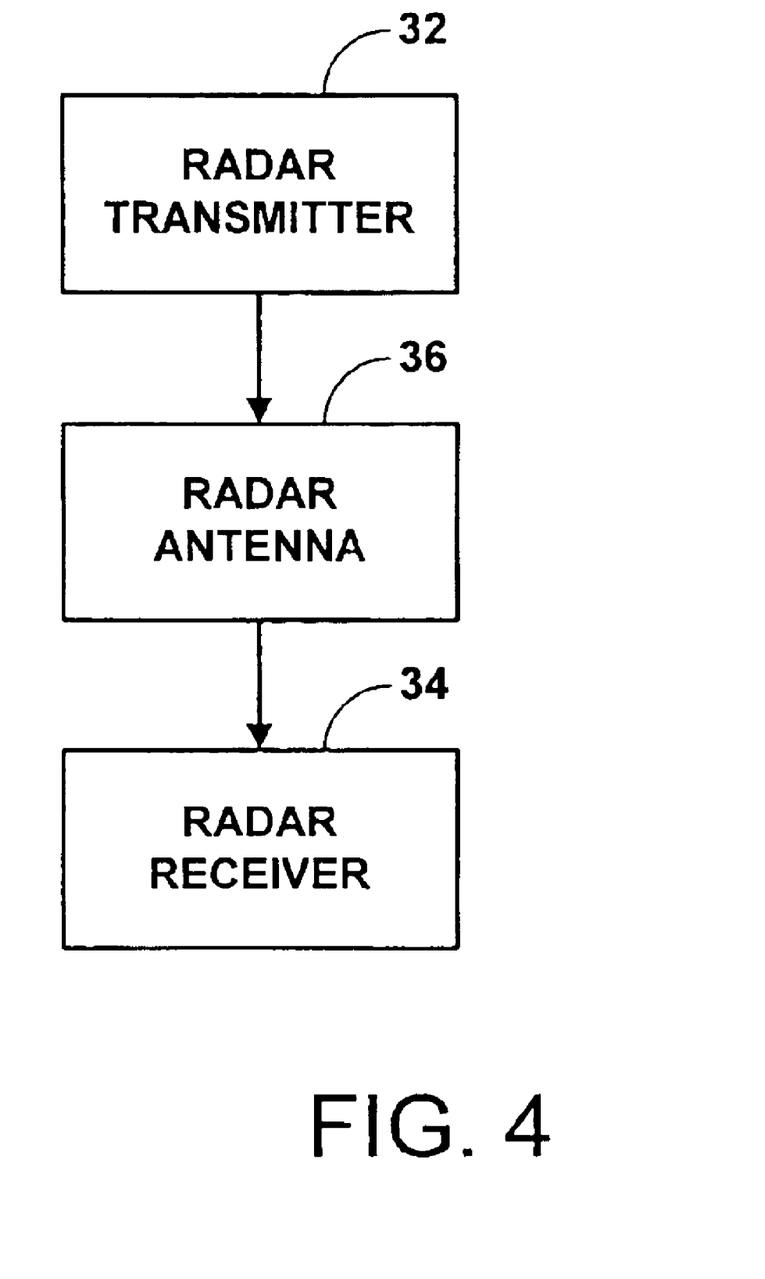
FIG. 4 is a schematic diagram of a radar assembly of a radar/laser cluster.

Optionally, in yet another embodiment of the invention, the system could be positioned on a ship or barge on a body of water, such as off the coast of areas that need to be protected (see FIG. 3). Rather than using a system of the invention with a substantially hemispherical periphery, the system may be modified to cover a fraction of a hemispherical space, such as half of the hemispherical space, and it will be realized that this may be accomplished by "turning off" a portion of the radar/laser clusters on the support. Such partial protection may be employed, for example, adjacent to a coastal area.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for detecting airborne objects in a zone occupying a three-dimensional space in the atmosphere above the Earth and for simultaneously defending against the airborne objects located in the zone, comprising:

a support for being positioned adjacent to the surface of the Earth at a bottom of the zone;

detecting and defending means mounted on the support for detecting airborne objects in the zone and defending against the airborne objects in the zone; and controlling means for controlling the detecting and defending means;

wherein the detecting and defending means comprises a plurality of radar/laser clusters mounted on the support, each of the radar/laser clusters transmitting along an axis defining a detection vector, the axis of the detection vector of each radar/laser cluster radiating outwardly from the support and extending into and through the zone.

2. The system of claim 1 wherein each of the radar/laser clusters comprises:

at least one radar assembly for detecting airborne objects in the zone; and at least one laser assembly for defending against airborne objects in the zone, the laser assembly generating a laser beam extending along an axis of a defending vector.

3. The system of claim 2 wherein the radar assembly comprises a radar transmitter, a radar receiver, and an antenna in communication with the radar transmitter and radar receiver, and the laser assembly comprises a laser transmitter.

4. The system of claim 3 wherein the laser transmitters of the laser assembly of each radar/laser cluster are positioned around the antenna of the radar assembly of the radar/laser cluster.

5. The system of claim 2 wherein the controlling means controls the radar assemblies and the laser assemblies of the radar/laser clusters, the controlling means comprising processing means for processing information from the radar transmitters and radar receivers.

6. The system of claim 2 wherein the controlling means comprises identification means for identifying authorized airborne objects in the zone, the identification means comprising a radio receiver for receiving radio signals from an authorized airborne object, the controlling means being adapted to modify operation of the radar/laser clusters with respect to the authorized airborne object when the radio signals are received from the authorized airborne object until the authorized airborne object leaves the zone.

7. The system of claim 2 wherein each of the plurality of radar/laser clusters includes a set of more than one laser assembly, the set of laser transmitters of each radar/laser cluster being oriented such that the axis of the defending vector of each laser transmitter of the set is substantially parallel to the axis of the defending vector of other laser transmitters of the set.

8. The system of claim 7 wherein the support has a convex outer extent; and wherein the axis of the defending vector of each of the laser transmitters of the radar/laser clusters is oriented at an angle with respect to a normal axis, the normal axis being oriented substantially perpendicular to a plane oriented tangent to the convex outer extent of the support, the axis of the defending vector of each of the laser transmitters of the set of a said radar/laser cluster being oriented at substantially the same angle with respect to the normal axis.

9. The system of claim 2 wherein the laser transmitters of the laser assemblies of the radar/laser clusters are capable of generating laser beams of variable intensity.

10. The system of claim 9 wherein the intensity of the laser beams generated by the laser transmitters is sufficient to destroy objects struck by the laser beam within a predetermined distance from the laser transmitter in the zone.

11. The system of claim 9 wherein the intensity of the laser beams generated by the laser transmitters is controlled by the controlling means, the controlling means increasing the intensity of the laser beams of the laser transmitters as an airborne object moves closer to the support.

12. The system of claim 1 wherein the plurality of radar/laser clusters each have an outer limit of effective range that defines an outer periphery of the zone, the outer periphery of the zone being substantially hemispherical.

13. The system of claim 1 wherein the support has a convex outer extent; and wherein the plurality of radar/laser clusters arc positioned in an array substantially covering the convex outer extent of the support.

14. The system of claim 1 wherein the radar assembly of each radar/laser cluster transmits and receives radar signals at a frequency that is different from frequencies at which the radar assembly of each of the other radar/laser clusters transmit and receive.

15. The system of claim 1 wherein the laser assembly of the radar/laser cluster emits a laser beam only when an airborne object is detected entering the zone.

16. The system of claim 1 wherein the detecting and defending means comprises at least one cluster comprising at least one radar apparatus and at least one laser apparatus, the at least one laser apparatus being responsive to information provided by the at least one radar apparatus.

17. A system for detecting airborne objects in a zone occupying a three-dimensional space in the atmosphere above the Earth and for simultaneously defending against the airborne objects located in the zone, comprising:

a support for being positioned adjacent to the surface of the Earth at a bottom of the zone, the support having a convex outer extent, the outer extent of the support comprising a substantially hemispherical-shaped dome;

detecting and defending means mounted on the support for detecting airborne objects in the zone and defending against the airborne objects in the zone, the detecting and defending means comprising a plurality of radar/laser clusters mounted on the support, each of the radar/laser clusters transmitting along an axis defining a detection vector, the axis of the detection vector of each radar/laser cluster extending into and through the zone, the axis of the detection vectors of the plurality of the radar/laser clusters radiating outwardly from the support in a substantially uniformly angularly separated manner, each of the radar/laser clusters comprising:

at least one radar assembly for detecting airborne objects in the zone, the radar assembly comprising a radar transmitter, a radar receiver, and an antenna in communication with the radar transmitter and radar receiver, the radar transmitter transmitting along the axis of the detection vector, and the radar receiver receiving along the axis of the detection vector;

at least one laser assembly for defending against airborne objects in the zone, the laser assembly comprising a laser transmitter for generating a coherent laser beam, the laser assembly generating a laser beam oriented along an axis of a defending vector, the axis of the detection vector being substantially parallel to the axis of the defending vector;

wherein the plurality of radar/laser clusters each have an outer limit of effective range that defines an outer periphery of the zone, the zone being substantially hemispherical;

wherein each of the plurality of radar/laser clusters includes a set of more than one laser assembly, the set of laser transmitters of each radar/laser cluster being oriented such that the axis of the defending vector of each laser transmitter of the set is substantially parallel to the axis of the defending vector of other laser transmitters of the set;

wherein the laser transmitters of the laser assembly of each radar/laser cluster are positioned around the antenna of the radar assembly of the radar/laser cluster;

wherein the plurality of radar/laser clusters are positioned in an array substantially covering the convex outer extent of the support;

wherein the outer extent of the support comprises a surface, the surface of the support having a plurality of ports formed therein for permitting passage therethrough of coherent laser beam of the laser assembly of the radar/laser cluster and of radar signals of the radar assembly of the same radar/laser cluster such that radar signals can both be transmitted and received by the antenna of the radar assembly of the radar/laser cluster;

wherein the axis of the defending vector of each of the radar/laser clusters is oriented at an angle with respect to a normal axis, the normal axis being oriented substantially perpendicular to a plane oriented tangent to the convex outer extent of the support, the axis of the defending vector of each of the laser transmitters of the set of a said radar/laser cluster being oriented at substantially the same angle with respect to the normal axis, the angles formed by the axis of the defending vector and the normal axis having a non-zero measurement;

wherein the radar assembly of each radar/laser cluster transmits and receives radar signals at a frequency that is different from frequencies at which the radar assembly of each of the other radar/laser clusters transmit and receive;

wherein the laser transmitters are capable of generating laser beams of variable intensity, a range of intensities of the laser beams of the laser transmitters ranging from a low intensity to a high intensity, the low intensity being substantially harmless to airborne objects and the high intensity being capable of generating heat in an airborne object;

wherein the intensity of the laser beams generated by the laser transmitters have sufficient energy to destroy objects struck by the laser beam within a predetermined distance from the laser transmitter in the zone;

wherein the laser transmitters can generate laser beams having intensities greater than approximately 100 kilowatts;

wherein the intensity of the laser beams generated by the laser transmitters is controlled by the controlling means, the controlling means increasing the intensity of the laser beams of the laser transmitters as an airborne object moves closer to the support;

controlling means for controlling the radar assemblies and the laser assemblies of the radar/laser clusters, the controlling means comprising processing means for processing information from the radar transmitters and radar receivers, the controlling means comprising storage means for storing information, the controlling means comprising identification means for identifying authorized airborne objects in the zone, the identification means comprising a radio receiver for receiving radio signals from an authorized airborne object, the controlling means being adapted to modify operation of the radar/laser clusters with respect to the authorized airborne object when the radio signals are received from the authorized airborne object until the authorized airborne object leaves the zone.

18. A system for detecting airborne objects in a zone occupying a three-dimensional space in the atmosphere above the Earth and for simultaneously defending against the airborne objects located in the zone, comprising:

a support for being positioned at a bottom of the zone;

radar means mounted on the support for detecting airborne objects in the zone; and laser means mounted on the support for defending against the airborne objects in the zone detected by the detecting means.

19. A system for detecting airborne objects in a zone occupying a three-dimensional space in the atmosphere above the Earth and for simultaneously defending against the airborne objects located in the zone, comprising:

a support for being positioned at a bottom of the zone;

a radar apparatus mounted on the support for detecting airborne objects in the zone;

a laser apparatus mounted on the support for defending against the airborne objects in the zone;

wherein the laser apparatus is responsive to the radar apparatus such that objects detected by the radar apparatus are targetable by the laser apparatus.

* * * * *